United States Patent
Leonelli, Jr.

(10) Patent No.: US 10,409,055 B2
(45) Date of Patent: Sep. 10, 2019

(54) SELF-CLEANING VEHICLE CAMERA ASSEMBLIES

(71) Applicant: VEONEER US, INC., Southfield, MI (US)

(72) Inventor: Frank Paul Leonelli, Jr., Goleta, CA (US)

(73) Assignee: Veoneer US, Inc., Southfield, MI (US)

( * ) Notice: Subject to any disclaimer, the term of this patent is extended or adjusted under 35 U.S.C. 154(b) by 0 days.

(21) Appl. No.: 15/828,203

(22) Filed: Nov. 30, 2017

(65) Prior Publication Data

US 2019/0162951 A1  May 30, 2019

(51) Int. Cl.
| | |
|---|---|
| *G02B 27/00* | (2006.01) |
| *B60S 1/48* | (2006.01) |
| *B60R 1/06* | (2006.01) |
| *B60S 1/52* | (2006.01) |
| *B60S 1/56* | (2006.01) |
| *G03B 17/56* | (2006.01) |

(52) U.S. Cl.
CPC ........ *G02B 27/0006* (2013.01); *B60R 1/0602* (2013.01); *B60S 1/482* (2013.01); *B60S 1/524* (2013.01); *B60S 1/56* (2013.01); *G03B 17/568* (2013.01); *G03B 2217/002* (2013.01)

(58) Field of Classification Search
CPC . B60S 1/56; B60S 1/52; B60S 1/0848; G02B 27/0006; G03B 17/02; H04N 5/2171; H04N 5/2251; H04N 5/2252
See application file for complete search history.

(56) References Cited

U.S. PATENT DOCUMENTS

| | | | |
|---|---|---|---|
| 9,126,534 B2 | 9/2015 | Snider | |
| 9,452,739 B2 | 9/2016 | Kikuta et al. | |
| 9,505,382 B2 | 11/2016 | Gokan | |
| 2009/0250533 A1 | 10/2009 | Akiyama et al. | |
| 2015/0040953 A1* | 2/2015 | Kikuta | B60S 1/56 134/123 |
| 2015/0166021 A1 | 6/2015 | Gokan et al. | |
| 2015/0344001 A1* | 12/2015 | Lopez Galera | B60S 1/56 134/198 |

(Continued)

FOREIGN PATENT DOCUMENTS

| | | |
|---|---|---|
| CN | 104044558 | 9/2014 |
| DE | 102014202072 | 7/2015 |

(Continued)

OTHER PUBLICATIONS

Concise Explanation of Relevance of JP2007053448 (2 pgs).

(Continued)

*Primary Examiner* — Chiawei Chen
(74) *Attorney, Agent, or Firm* — Matthew D. Thayne; Thayne and Davis LLC

(57) ABSTRACT

Vehicle camera assemblies comprising integrated self-cleaning assemblies. In some embodiments, the self-cleaning assembly may be configured to engage the camera housing and/or assembly by way of a snap-fit connection. In some embodiments, the snap-fit means may comprise a flexible coupling member. In some such embodiments, the snap-fit means may further comprise a rigid coupling member. The cleaning assembly may be removably coupleable with the camera housing to allow for cleaning, maintenance, and the like.

12 Claims, 5 Drawing Sheets

(56) References Cited

U.S. PATENT DOCUMENTS

| | | | |
|---|---|---|---|
| 2015/0353024 A1* | 12/2015 | Cooper | B60R 11/04 |
| | | | 348/148 |
| 2016/0272163 A1* | 9/2016 | Dreiocker | B60S 1/56 |
| 2016/0311405 A1 | 10/2016 | Richardson et al. | |
| 2016/0325715 A1 | 11/2016 | Niemczyk | |
| 2017/0021809 A1* | 1/2017 | Trebouet | B60S 1/0848 |
| 2017/0072909 A1* | 3/2017 | Giraud | B60S 1/524 |
| 2017/0078583 A1* | 3/2017 | Haggerty | A61B 1/00096 |
| 2017/0182980 A1* | 6/2017 | Davies | B60S 1/0848 |
| 2017/0334366 A1* | 11/2017 | Sliwa | B60R 11/04 |
| 2018/0126921 A1* | 5/2018 | Koseki | B08B 3/02 |
| 2018/0215350 A1* | 8/2018 | Herrmann | B60S 1/0848 |

FOREIGN PATENT DOCUMENTS

| | | |
|---|---|---|
| DE | 102014117165 | 5/2016 |
| JP | 2001171491 | 12/1999 |
| JP | 2004182080 | 7/2004 |
| JP | 2007053448 | 3/2007 |
| MX | 2016005208 | 10/2016 |
| WO | WO2014010578 | 1/2014 |
| WO | WO2014010580 | 1/2014 |

OTHER PUBLICATIONS

Concise Explanation of Relevance of JP2004182080 (2 pgs).
Concise Explanation of Relevance of WO2014010578 (2 pgs).
Concise Explanation of Relevance of JP2001171491 (2 pgs).
Concise Explanation of Relevance of MX2016005208 (2 pgs).
Concise Explanation of Relevance of DE102014117165 (2 pgs).
Concise Explanation of Relevance of DE102014202072 (2 pgs).
Concise Explanation of Relevance of CN104044558 (2 pgs).
Concise Explanation of Relevance of WO2014010580 (2 pgs).
Jan. 15, 2019 PCT/US2018/062928 International Search Report (3 pgs).
Jan. 15, 2019 PCT/US2018/062928 Written Opinion (6 pgs).

* cited by examiner

SELF-CLEANING VEHICLE CAMERA ASSEMBLIES

SUMMARY

Cameras are often used in modern vehicles for a variety of purposes, including monitoring of surrounding vehicles, pedestrians, and other objects. However, the lens or other exterior window of the optical sensor of such cameras may become obstructed by foreign substances during driving, which may render such cameras inoperable or at least hinder performance. To remedy such problems, various prior inventions have been proposed to incorporate self-cleaning functionality, such as by providing a cleaning nozzle for delivery of a cleaning fluid, such as a liquid and/or compressed gas, to remove foreign substances without requiring manual removal.

However, existing self-cleaning cameras suffer from a variety of potential problems. For example, many current designs utilize bulky and/or relatively expensive brackets on which to mount a nozzle for cleaning. Such brackets must be mounted to the vehicle and/or the camera unit and may occupy valuable space adjacent one or more vehicle bumpers and may be unsightly. In addition, many existing assemblies may be configured in a manner that makes servicing and/or removal of the nozzle or other cleaning portion difficult.

The present inventors have therefore determined that it would be desirable to provide systems and methods that overcome one or more of the foregoing limitations and/or other limitations of the prior art. Thus, in some embodiments, the inventive concepts disclosed herein may be used to provide a cleaning assembly, such as an assembly comprising one or more cleaning nozzles, that may be easily coupled and/or decoupled from a camera/camera housing. In some embodiments, the cleaning assembly may be coupled with the camera/camera housing in a snap-fit configuration. In some embodiments, the assembly may also be easily removed from the camera/camera housing.

In a more particular example of a vehicle camera assembly according to some embodiments, the assembly may comprise a housing and a vehicle camera, such as an infrared or visible light camera coupled with the housing. A self-cleaning assembly may be coupleable, in some embodiments releasably coupleable, with the housing. The assembly may further comprise means for releasably locking the self-cleaning assembly with the housing.

In some embodiments, the means for releasably locking the self-cleaning assembly with the housing may comprise snap-fit engagement means for releasably locking the self-cleaning assembly with the housing in a snap-fit configuration. In some such embodiments, the snap-fit engagement means may comprise a resiliently-deformable snap-fit engagement means, such as a flexible coupling member configured to resiliently deform and engage a feature, such as a recess or ridge, which may be formed on the housing. In some embodiments, the flexible coupling member may extend from the self-cleaning assembly to allow for coupling with the engagement feature.

In some embodiments, the means for releasably locking the self-cleaning assembly with the housing may comprise a flexible coupling member configured to resiliently engage at least one of a recess and a ridge formed on the housing. In some such embodiments, the flexible coupling member may comprise a locking feature, such as a hooked end portion configured to releasably engage the at least one of a recess and a ridge.

In some embodiments, the means for releasably locking the self-cleaning assembly with the housing may further comprise a rigid coupling member. In some such embodiments, the means for releasably locking the self-cleaning assembly with the housing may comprise a pair of rigid coupling members. In some such embodiments, the pair of rigid coupling members may be formed on the self-cleaning assembly. The means for releasably locking the self-cleaning assembly with the housing may further comprise a second pair of rigid coupling members formed on the housing. The pair of rigid coupling members may be configured to slidably engage the second pair of rigid coupling members. The second pair of rigid coupling members may protrude from an exterior surface of the housing. In some embodiments, the at least one of a recess and a ridge may be formed in the exterior surface of the housing in between the second pair of rigid coupling members.

In a vehicle camera assembly according to other embodiments, the assembly may comprise a housing and camera, such as a night-vision or infrared camera, coupled with the housing. The camera may comprise an exterior window and/or lens, which may be exposed to the environment of the vehicle. The assembly may further comprise a fluid spray nozzle assembly configured to spray a fluid upon the exterior window when the fluid spray nozzle assembly is coupled with the housing and a snap-fit member configured to releasably couple the fluid spray nozzle assembly with the camera in a position to allow the fluid to contact the exterior window.

In some embodiments, the snap-fit member may comprise an elastic snap-fit member configured to resiliently deform to engage at least one of a recess and a ridge to couple the fluid spray nozzle assembly with the camera. In some such embodiments, the at least one of a recess and a ridge may be formed on the housing. In some embodiments, the snap-fit member may be configured to releasably couple the fluid spray nozzle assembly with the housing.

In some embodiments, a cleaning assembly for coupling with a vehicle camera may comprise a body and a nozzle and/or nozzle assembly coupled with the body. The nozzle may be configured to deliver a fluid therethrough to clean a lens and/or window of a vehicle camera upon coupling the cleaning assembly with the vehicle camera. The cleaning assembly may further comprise a rigid coupling member configured to engage a vehicle camera housing to allow the cleaning assembly to be coupled with the vehicle camera; and a flexible coupling member configured to engage the vehicle camera housing.

In some embodiments, the flexible coupling member may comprise a locking feature, such as a hooked end portion. The hooked end portion may be configured to resiliently engage an engagement feature, such as a recess and/or ridge formed on the vehicle camera unit/assembly.

In some embodiments, the body may further comprise a pair of rigid coupling members. In some such embodiments, the flexible coupling member may extend from the body in between the pair of rigid coupling members.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to apparatus and systems for cleaning vehicle cameras, such as infrared vehicle cameras. In some embodiments, the inventive principles disclosed herein may be used to allow for a nozzle assembly to be easily snapped or otherwise locked in place, in some embodiments releasably locked in place, on a camera assembly and/or housing. In preferred embodiments, snap-fit engagement means, such as one or more flexible coupling members comprising one or more features for releasably locking the self-cleaning assembly with a vehicle camera housing in a snap-fit configuration, such as a hooked end portion, and/or one or more rigid coupling members that may be configured to be, for example, slidably engaged with the housing.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
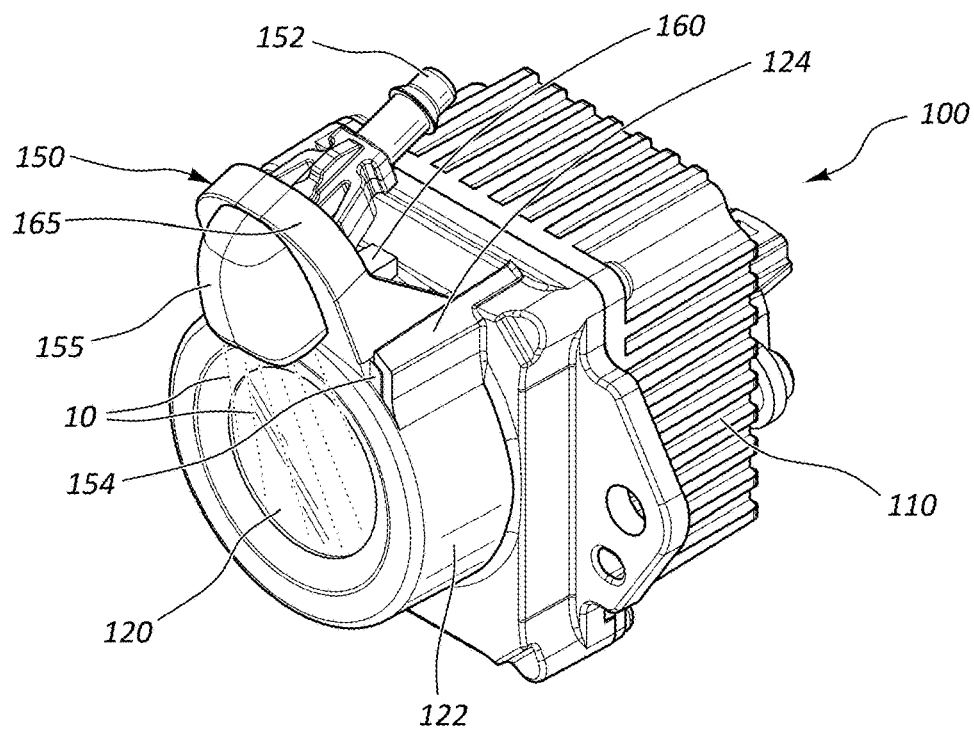
FIG. 1 is a perspective view of a vehicle camera assembly comprising a cleaning assembly coupled with a vehicle camera according to some embodiments.

FIG. 1 is a perspective view of a vehicle camera assembly 100. Vehicle camera assembly 100 comprises a camera housing 110. Camera housing 110 comprises a lens housing 122 that projects from the main body of housing 110 and an exterior window 120, which may comprise a lens and/or may protect one or more lenses behind window 120. A fluid spray nozzle assembly 150 is coupled with housing 110. Fluid spray nozzle assembly 150 is configured to spray a fluid 10 upon the exterior window 120 when the fluid spray nozzle assembly 150 is coupled with the housing 110.

As explained below and best seen in subsequent figures, fluid spray nozzle assembly 150 may comprise a body 165, which may comprise a flexible coupling member 160, which may be configured to provide for a releasable, snap-fit coupling with housing 110. In the depicted embodiment, flexible coupling member 160 comprises a hooked end portion that may be configured to engage an engagement feature 130, such as a recess or ridge/protrusion formed on housing 110. In addition, fluid spray nozzle assembly 150 comprises a pair of rigid coupling members 154 and 156, both of which are configured to slidably engage a corresponding pair of rigid coupling members 124 and 126, respectively, formed on housing 110. Coupling members 154/156 are preferably formed with mating features configured to engage corresponding mating features formed on coupling members 124/126 to allow for a sliding engagement therebetween. In some embodiments, coupling members 154/156 may be configured to slidably nest within the corresponding mating features of coupling members 124/126.

Figure 2:
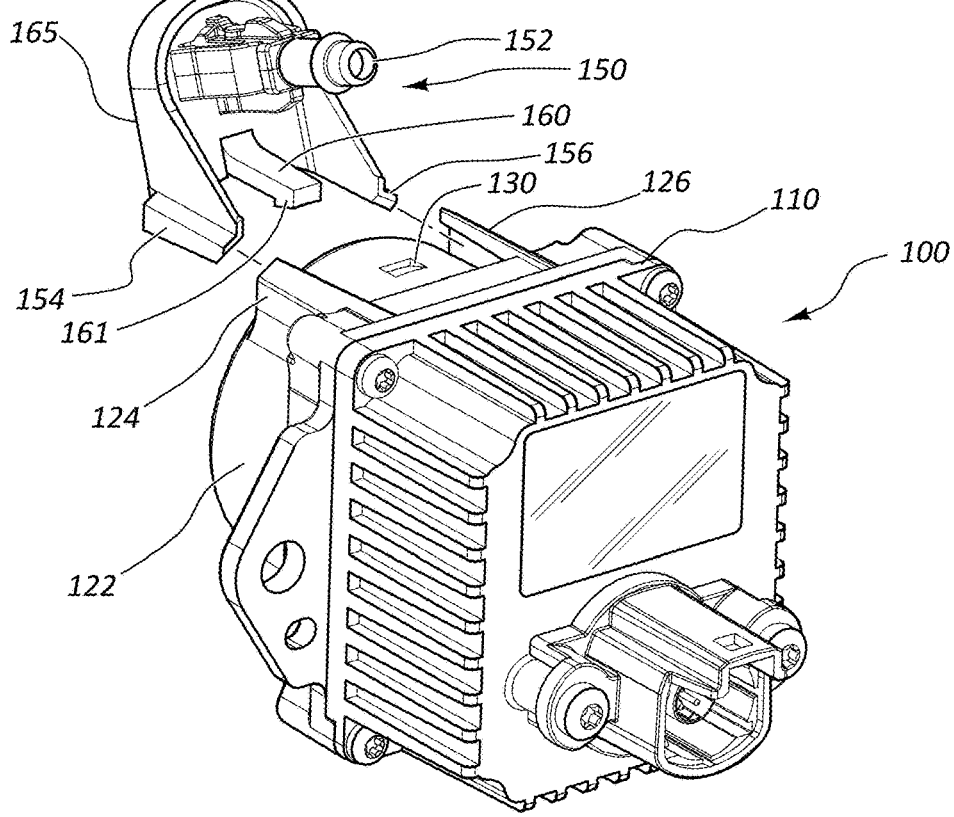
FIG. 2 is an exploded, perspective view of the embodiment of FIG. 1 showing the cleaning assembly being coupled with the vehicle camera in a snap-fit manner.

FIG. 2 is an exploded, perspective view of vehicle camera assembly 100 with fluid spray nozzle assembly 150 shown decoupled from housing 110. As better seen in this figure, body 165 is angled with respect to housing 110 and exterior window 120 to allow the cleaning fluid nozzle 158 (see FIG. 5) to be directed back at exterior window 120. Port 152 is configured to be coupled with a cleaning fluid source to allow for delivery of the cleaning fluid onto exterior window 120.

In addition, FIG. 2 shows engagement feature 130 positioned in between rigid coupling members 124 and 126 on the top surface of lens housing 122. Thus, upon inserting rigid coupling members 154/156 into rigid coupling members 124/126 and sliding fluid spray nozzle assembly 150 towards housing 110, flexible coupling member 160 is configured to resiliently deform and then allow hooked end portion 161 to seat with engagement feature 130 to lock fluid spray nozzle assembly 150 onto housing 110. Also, rigid coupling members 154/156 and flexible coupling member 160 are configured to allow a user to deform flexible coupling member 160 to allow hooked end portion 161 to disengage from engagement feature 130 and, ultimately, to allow fluid spray nozzle assembly 150 to be removed from housing 110 if needed.

Flexible coupling member 160, along with rigid coupling members 154/156, rigid coupling members 124/126, and engagement feature 130, such as a recess and/or ridge, is an example of means for locking, or releasably locking, a self-cleaning assembly with a camera housing. Flexible coupling member 160, along with rigid coupling members 154/156, rigid coupling members 124/126, and engagement feature 130 is also an example of flexible coupling snap-fit engagement means for locking, or releasably locking, a self-cleaning assembly with a housing in a snap-fit configuration. Moreover, flexible coupling member 160 is an example of a resiliently-deformable snap-fit engagement means.

Figure 3:
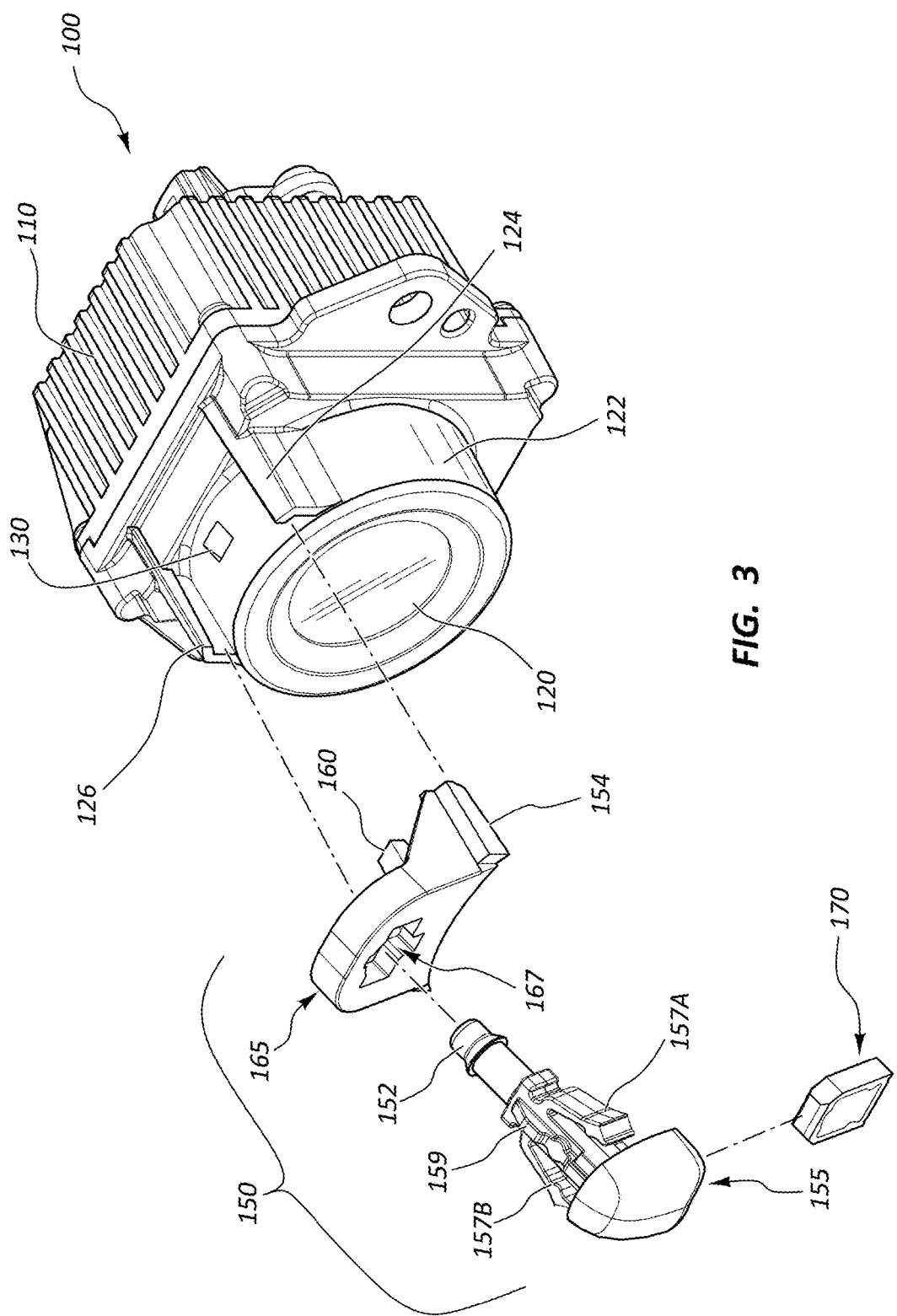
FIG. 3 is another exploded, perspective view of the embodiment of FIG. 1 showing the cleaning assembly removed from the vehicle camera and showing various separable elements of the cleaning assembly removed from one another.

FIG. 3 is another exploded, perspective view of vehicle camera assembly 100 with fluid spray nozzle assembly 150 shown decoupled from housing 110. As also shown in this figure, fluid spray nozzle assembly 150 may comprise a modular plurality of additional components that may be coupled with one another, in some embodiments also in a "snap-fit" configuration. As used herein, "snap fit" means a coupling between two elements formed by the shape of the elements so that the elements are attached by assembling them together. In deformable snap-fit configurations, the shape of the elements causes a deflection or deformation in either one or both of the elements and thereby causes the two elements to be held together. As previously mentioned, some embodiments/elements disclosed herein may further comprise detachable or decoupleable snap-fit configurations wherein the two elements may be separated from one another, such as by reversing the initial deformation.

As shown in FIG. 3, fluid spray nozzle assembly 150 may comprise a body 165 having a central opening 167. Opening 167 may comprise one or more features configured to allow for an engagement, such as a snap-fit engagement, between body 165 and nozzle piece 155. Thus, for example, nozzle piece 155 comprises a pair of opposing coupling members 157A/157B. Preferably, coupling members 157A/157B comprise resiliently flexible coupling members that are configured to flex towards one another to fit through opening 167 and then expand outwards to lock nozzle piece 155 in place within body 165. One or more other features may further facilitate a desired coupling. For example, a raised ridge 159 may be formed on one or both sides of nozzle piece 155. Corresponding slots may be formed in opening 167 to facilitate coupling of nozzle piece 155 with body 165 in a desired orientation. As also shown in FIG. 3, a spray nozzle module 170 may be provided to allow for adjustment of the spray characteristics, such as the spray angle, distribution, force, and/or dispersion pattern.

The structure of rigid coupling members 124 and 126 can also be seen more clearly in FIG. 3. For example, it can be seen that coupling members 124 and 126 each comprises a ridge defining a slot or passageway for receipt of opposing coupling members 154 and 156, each of which comprises an elongated coupling member configured to be slidably received in the slots formed by coupling members 124 and 126.

Figure 4:
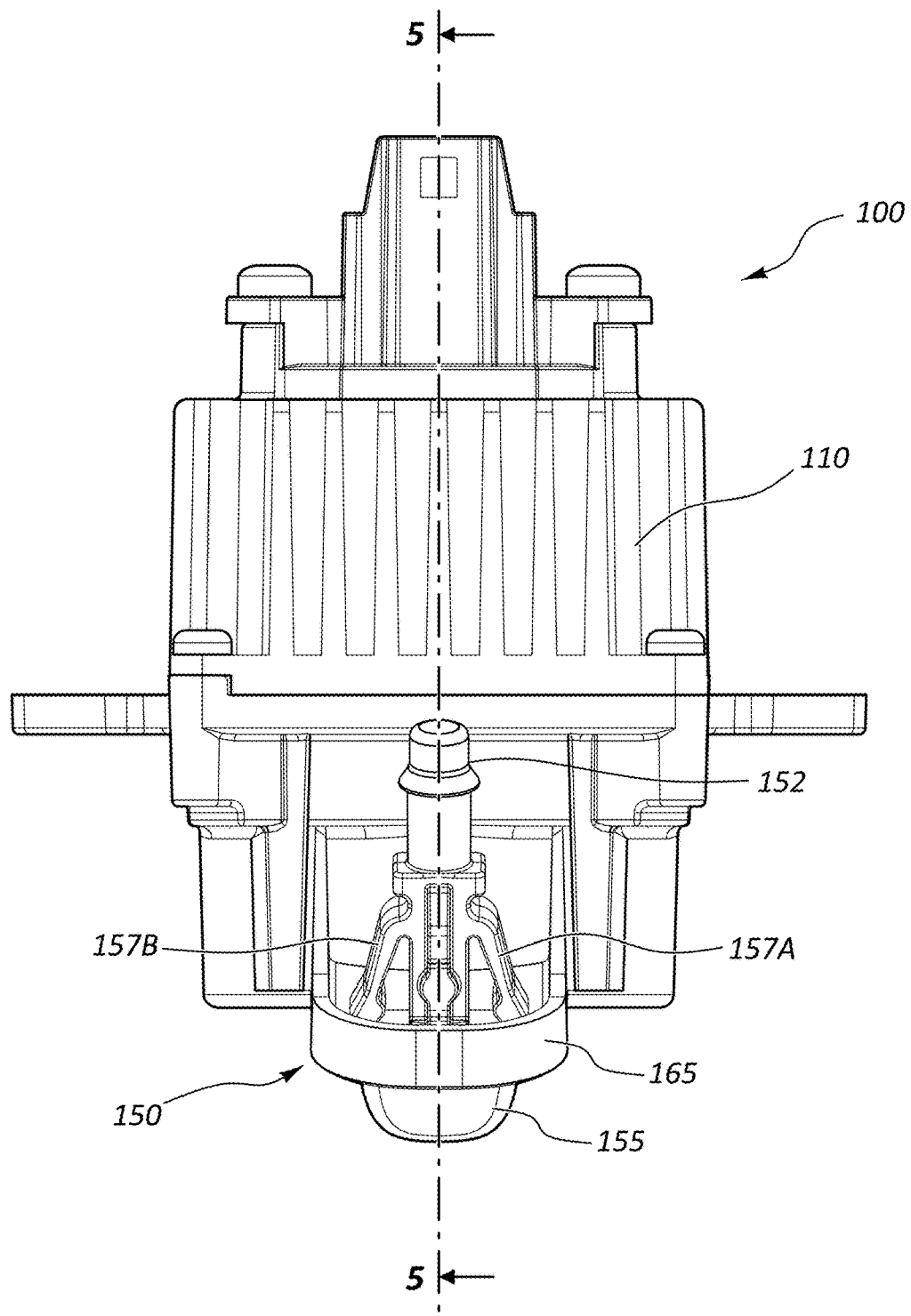
FIG. 4 is a top plan view of the embodiment of FIG. 1 with the cleaning assembly coupled to the vehicle camera.
Figure 5:
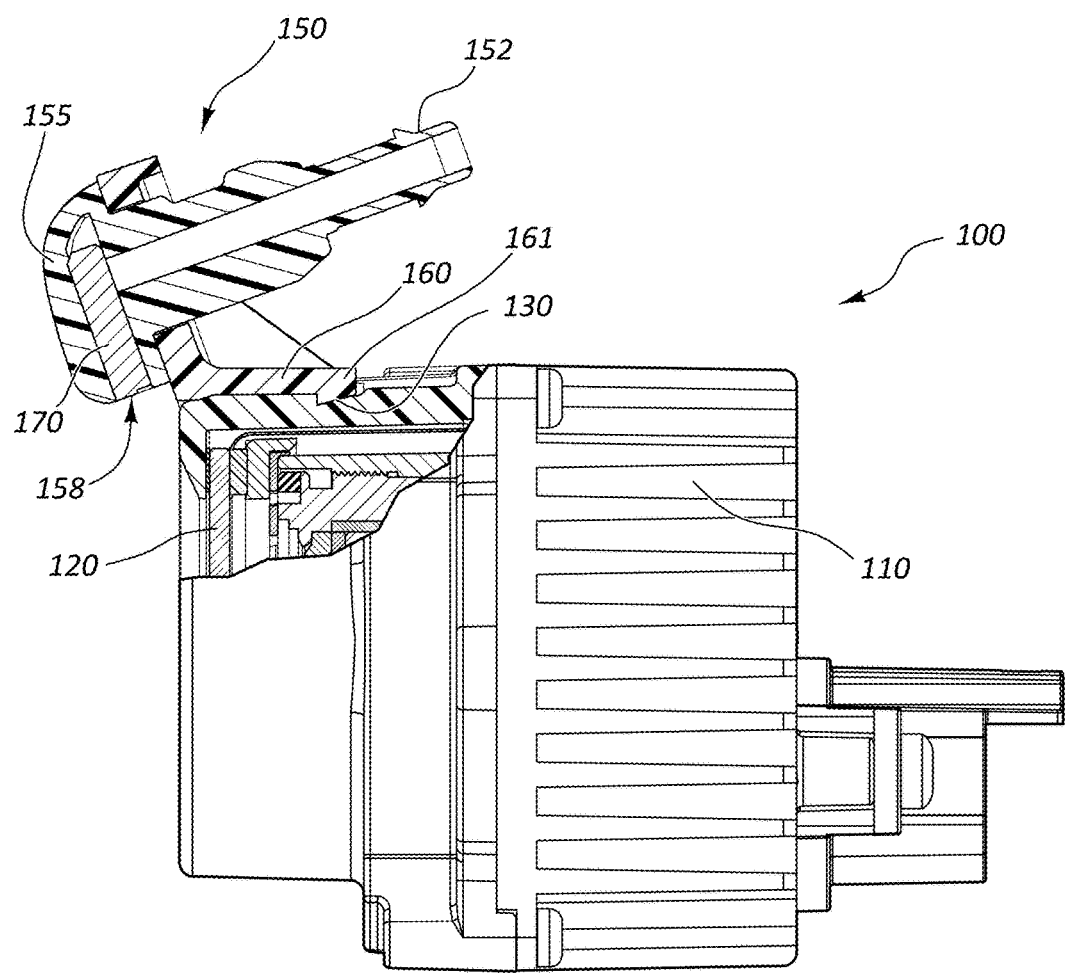
FIG. 5 is a partial, cross-sectional view of the vehicle camera assembly of FIG. 1 with the cleaning assembly coupled to the vehicle camera.

FIG. 4 is an upper plan view of vehicle camera assembly 100 after fluid spray nozzle assembly 150 has been coupled with housing 110. And FIG. 5 is a cross-sectional view taken along line 5-5 in FIG. 4. As shown in the cross-sectional view, cleaning fluid nozzle 158 is fluidly coupled with the opening of port 152 to allow for delivery of a cleaning fluid therethrough and onto outer window 120.

As also best seen in FIG. 5, the hooked end portion 161 of flexible coupling member 160 is seated within recess 130 to lock fluid spray nozzle assembly 150 in place onto the upper surface of housing 110. In addition, although not depicted in FIG. 5, as previously described, the opposing rigid coupling members 154 and 156 provide stability to the coupling means between fluid spray nozzle assembly 150 and housing 110.

Figure 6:
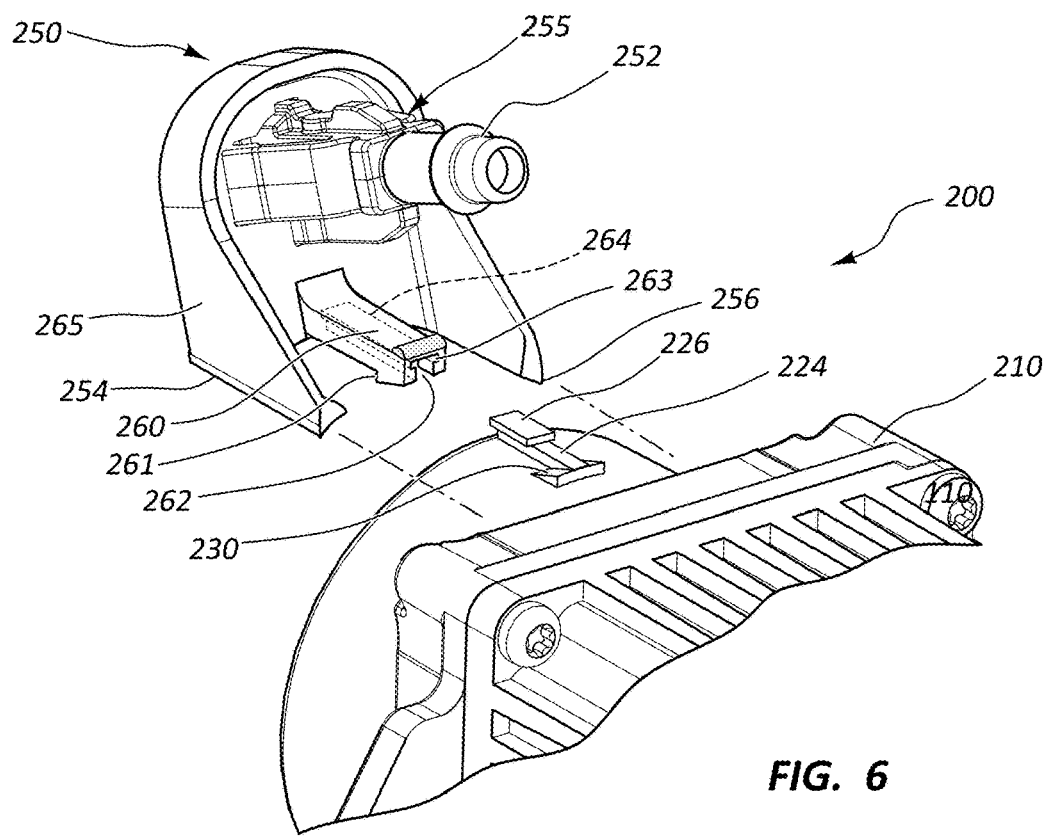
FIG. 6 is a partial, exploded, perspective view of a vehicle camera assembly comprising a cleaning assembly coupleable with a vehicle camera according to other embodiments with the cleaning assembly shown being coupled with the vehicle camera unit.
Figure 7:
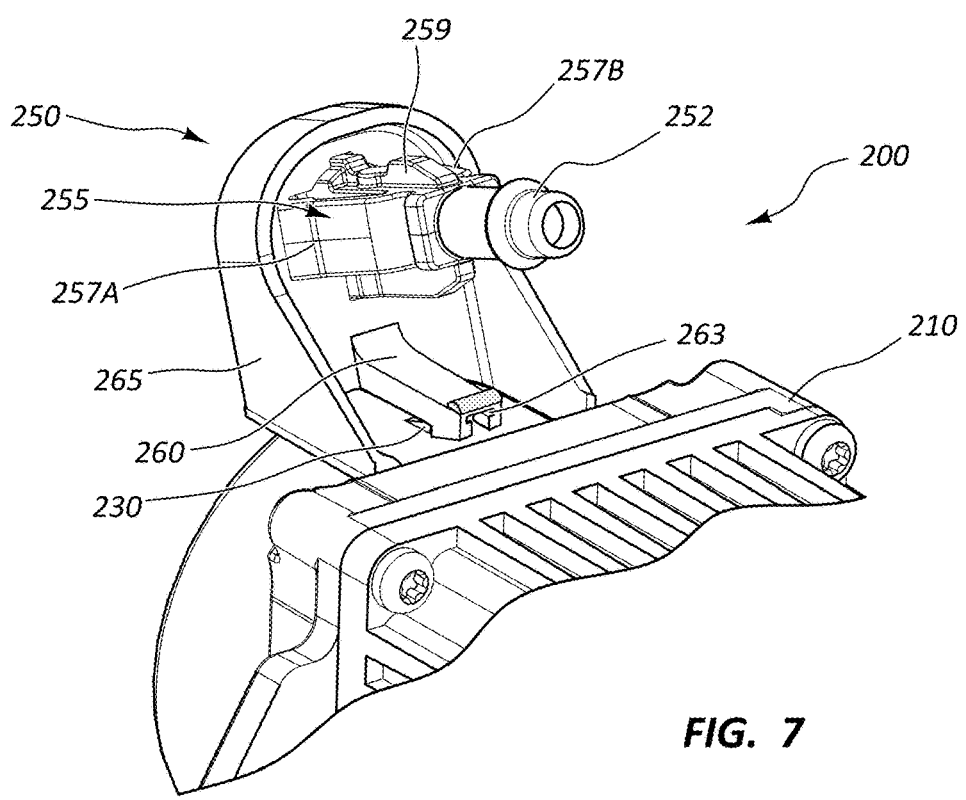
FIG. 7 is a partial, perspective view of the embodiment of FIG. 6 with the cleaning assembly shown coupled with the vehicle camera.

FIGS. 6 and 7 depict an alternative embodiment of a vehicle camera assembly 200 also having a fluid spray nozzle assembly 250 that is configured to be quickly and easily coupled with a camera housing 210. As with vehicle camera assembly 100, vehicle camera assembly 200 comprises a camera housing 210 having a lens housing that projects from the main body of housing 210 and an exterior window, which may comprise a lens and/or may protect one or more lenses behind the window. Again, fluid spray nozzle assembly 250 is configured to spray a fluid upon the exterior window when the fluid spray nozzle assembly 250 is coupled with the housing 210.

Fluid spray nozzle assembly 250 again comprises a body 265. Body 265 may be configured to angle the spray nozzle of assembly 250 so as to direct the cleaning fluid in a desirable manner towards the exterior window. Body 265 may also comprise one or more features configured to provide for a snap-fit coupling with housing 210. In some embodiments, this may comprise a releasable coupling.

Unlike fluid spray nozzle assembly 150, however, fluid spray nozzle assembly 250 only comprises a single, flexible coupling member 260 that is configured to engage a corresponding coupling member formed on the lens housing of camera housing 210. More particularly, coupling member 260 comprises an elongated, flexible prong having a hooked end portion similar to coupling member 160. However, coupling member 260 comprises a keyed opening at its distal end that comprises a horizontal slot 263 and a vertical slot 262, both of which extend into a recess 264 formed within coupling member 260. These slots 262/263 are configured to receive respective portions of the coupling member formed on camera housing 210, which coupling member comprises a plate portion 226 configured to be received in horizontal slot 263 and a bar or vertical portion 224 configured to be received within vertical slot 262.

A stop 230 or locking means may be provided, which may engage the hooked or pronged end portion 261 of coupling member 260 to secure the fluid spray nozzle assembly 250 in place on housing 210. In the depicted embodiment, stop 230 is ramped so as to provide a means for automatically flexing coupling member 260 during the snap-fit coupling process.

In addition, body 265 of fluid spray nozzle assembly 250 comprises a pair of stabilizing legs 254 and 256 or other stabilizing members, both of which are configured to slidably engage an upper surface of the lens housing of camera housing 210. As shown in FIG. 6, both of these stabilizing members preferably comprise lower surfaces that are angled to match the curved surface of the lens housing of camera housing 210. In this manner, by moving the slotted opening of coupling member 260 towards plate portion 226 and vertical portion 224, the feet or lower surfaces of stabilizing legs 254 and 256 are configured to contact the upper surface of housing 210 and slidably engage and guide coupling member 260 over the ramped stop 230 to lock the spray nozzle assembly 250 in place.

Coupling member 260, along with the corresponding coupling feature of camera housing 210, which is defined by plate portion 226 and vertical portion 224, is another example of means for locking, or releasably locking, a self-cleaning assembly with a camera housing. Flexible coupling member 260, along with the corresponding coupling feature of camera housing 210, which is defined by plate portion 226 and vertical portion 224, is also another example of flexible coupling snap-fit engagement means for locking, or releasably locking, a self-cleaning assembly with a housing in a snap-fit configuration. Moreover, flexible coupling member 260 is also another example of a resiliently-deformable snap-fit engagement means. Stabilizing legs 254 and 256 are an example of means for stabilizing a self-cleaning assembly with a housing, including an example of means for stabilizing a self-cleaning assembly with a housing while the cleaning assembly is being secured or locked to the housing with another component, such as another snap-fit locking means.

Although not shown in as much detail in FIGS. 6 and 7, fluid spray nozzle assembly 250 may comprise various other features/components in common with fluid spray nozzle assembly 150. For example, fluid spray nozzle assembly 250 may comprise a port 252 configured to be fluidly coupled with a source of cleaning fluid. Fluid spray nozzle assembly 250 may further comprise a body 265 having a central opening configured to allow for an engagement, such as a snap-fit engagement, between body 265 and a separate nozzle piece 255 of nozzle assembly 250. Thus, for example, nozzle piece 255 may again comprise a pair of opposing coupling members 257A/257B, which may comprise resiliently flexible coupling members that are configured to flex towards one another to fit through the opening, similar to opening 167, formed in nozzle body 265 and then expand outwards to lock nozzle piece 255 in place within body 265. Other features, such as one or more raised ridges 259 may also be formed on one or both sides of nozzle piece 255, which features may be configured to be received in corresponding slots or other features formed in the opening of nozzle body 265, as previously described, to facilitate coupling of nozzle piece 255 with body 265 in a desired orientation.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. A vehicle camera assembly, comprising:
   a housing;
   a camera coupled with the housing;
   a self-cleaning assembly releasably coupleable with the housing; and
   means for releasably locking the self-cleaning assembly with the housing, wherein the means for releasably locking the self-cleaning assembly with the housing comprises:
   a flexible coupling member configured to resiliently engage at least one of a recess and a ridge formed on the housing; and
   a rigid coupling member.

2. The vehicle camera assembly of claim 1, wherein the means for releasably locking the self-cleaning assembly with the housing comprises snap-fit engagement means for releasably locking the self-cleaning assembly with the housing in a snap-fit configuration.

3. The vehicle camera assembly of claim 2, wherein the snap-fit engagement means comprises a resiliently-deformable snap-fit engagement means.

4. The vehicle camera assembly of claim 1, wherein the flexible coupling member extends from the self-cleaning assembly.

5. The vehicle camera assembly of claim 1, wherein the flexible coupling member comprises a hooked end portion configured to releasably engage the at least one of a recess and a ridge.

6. The vehicle camera assembly of claim 1, wherein the means for releasably locking the self-cleaning assembly with the housing comprises a pair of rigid coupling members.

7. The vehicle camera assembly of claim 6, wherein the pair of rigid coupling members is formed on the self-cleaning assembly, wherein the means for releasably locking the self-cleaning assembly with the housing further comprises a second pair of rigid coupling members formed on the housing, and wherein the pair of rigid coupling members is configured to slidably engage the second pair of rigid coupling members.

8. The vehicle camera assembly of claim 7, wherein the second pair of rigid coupling members protrudes from an exterior surface of the housing, and wherein the at least one of a recess and a ridge is formed in the exterior surface of the housing in between the second pair of rigid coupling members.

9. A cleaning assembly for coupling with a vehicle camera, comprising:
   a body;
   a nozzle coupled with the body, wherein the nozzle is configured to deliver a fluid therethrough to clean an exterior window of a vehicle camera upon coupling the cleaning assembly with the vehicle camera;
   a rigid coupling member configured to engage a vehicle camera housing to allow the cleaning assembly to be coupled with the vehicle camera; and
   a flexible coupling member configured to engage the vehicle camera housing.

10. The cleaning assembly of claim 9, wherein the flexible coupling member comprises a hooked end portion, and wherein the hooked end portion is configured to resiliently engage an engagement feature formed on the vehicle camera.

11. The cleaning assembly of claim 10, wherein the body further comprises a pair of rigid coupling members.

12. The cleaning assembly of claim 11, wherein the flexible coupling member extends from the body in between the pair of rigid coupling members.

* * * * *